July 30, 1940.　　F. V. MAYO ET AL　　2,209,700
LIQUID METERING AND COST COMPUTING APPARATUS
Filed March 8, 1938　　4 Sheets-Sheet 1

INVENTORS.
Frank V. Mayo,
William H. Nisson.
BY
Chas. E. Townsend.
ATTORNEY.

July 30, 1940.  F. V. MAYO ET AL  2,209,700
LIQUID METERING AND COST COMPUTING APPARATUS
Filed March 8, 1938  4 Sheets-Sheet 2
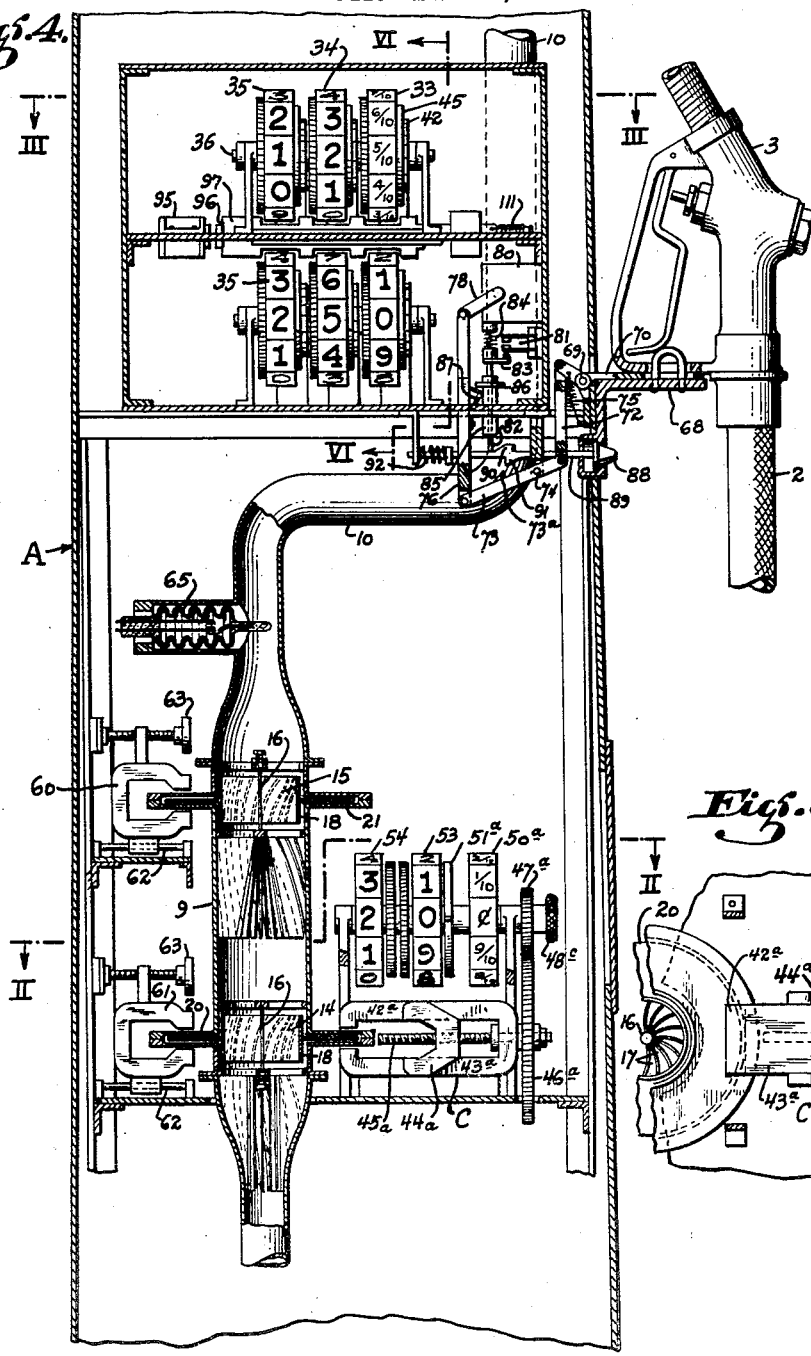
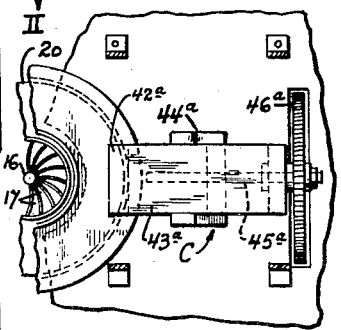
INVENTORS.
Frank V. Mayo,
William H. Misson.
BY Chas. E. Townsend.
ATTORNEY.

July 30, 1940.  F. V. MAYO ET AL  2,209,700
LIQUID METERING AND COST COMPUTING APPARATUS
Filed March 8, 1938  4 Sheets-Sheet 3

INVENTORS.
Frank V. Mayo.
William H. Misson.
BY Chas. E. Townsend.
ATTORNEY.

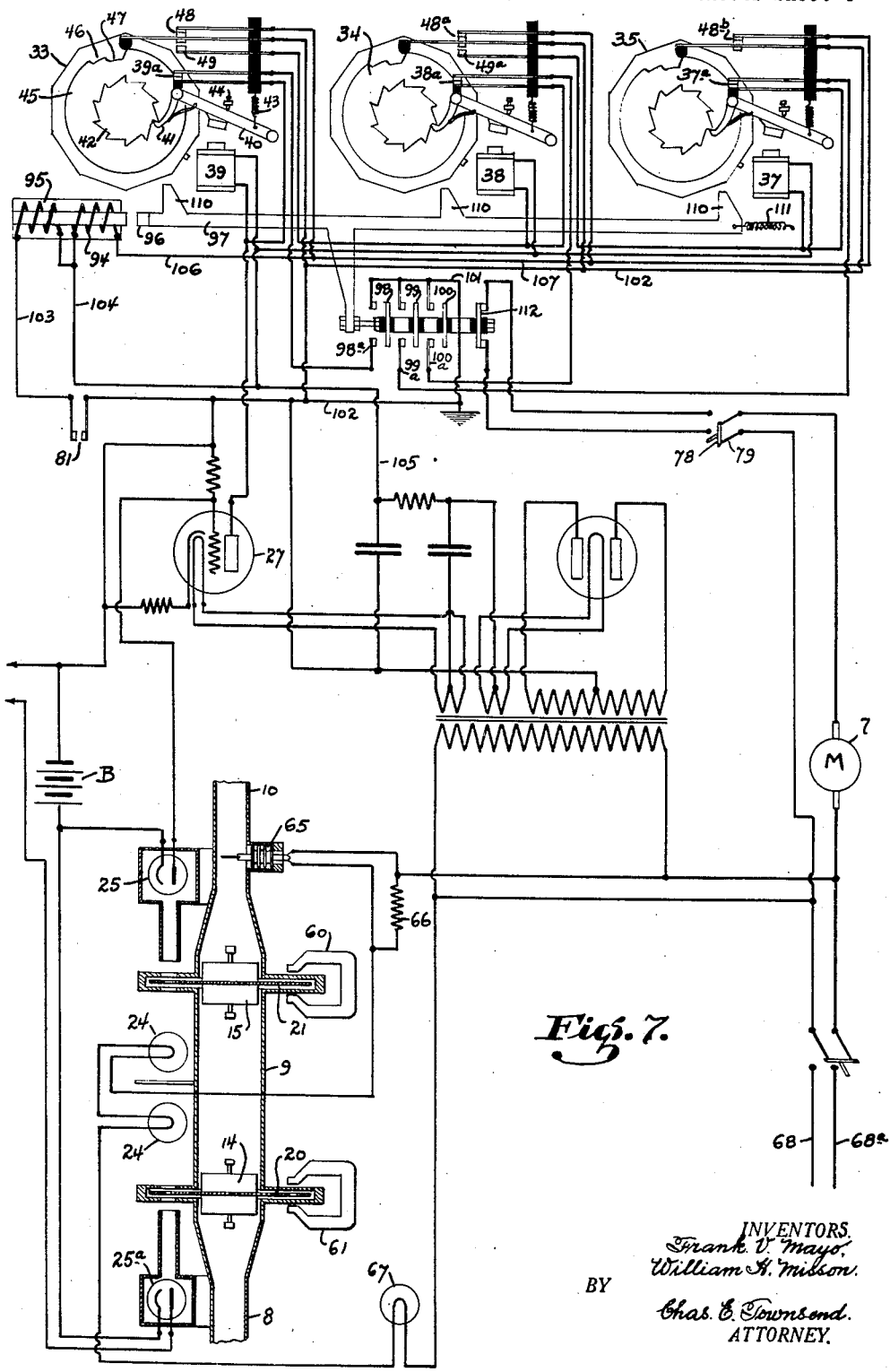

Patented July 30, 1940

2,209,700

UNITED STATES PATENT OFFICE 2,209,700

LIQUID METERING AND COST COMPUTING APPARATUS

Frank V. Mayo, Stockton, and William H. Misson, San Francisco, Calif.

Application March 8, 1938, Serial No. 194,578

9 Claims. (Cl. 73—230)

This invention relates to liquid dispensing apparatus, and particularly to means for metering and computing the cost of the liquid dispensed.

It has been proposed heretofore to provide liquid dispensing apparatus, such as gasoline pumps and the like, with means for metering the liquid, for computing the cost thereof and for recording and displaying both amounts; but such devices have usually been driven by the meter itself, or by some movable part of the pumping mechanism, or similar means, and as such, are involved and complicated, due to the numerous gear trains and other mechanism required.

The object of the present invention is generally to improve and simplify the construction and operation of apparatus of the character described; to provide a novel form of a metering mechanism actuated by the flow of the liquid being dispensed, and means operated by said metering mechanism for electrically recording and displaying the number of gallons and fractions of gallons dispensed; to provide other, and independently operating, means actuated by the flow of liquid being dispensed, which will electrically compute, record, and display the money value of the liquid dispensed; to provide means of calibrating and adjusting the liquid metering and price computing mechanisms independently of each other; and, further, to provide means actuated by the liquid being dispensed which will prevent operation of the liquid metering and price recording mechanisms until the dispensing nozzle is open and the flow or discharge of liquid has actually commenced.

The apparatus is shown by way of illustration in the accompanying drawings, in which—

Fig. 4 is an enlarged vertical section showing the metering and the cost-computing portion of the apparatus;

Fig. 5 is a plan view of the magnet C whereby the speed or rotation of the lower turbine rotor 14 is controlled;

Fig. 7 is a diagrammatic view showing the complete mechanism and the wiring circuits connecting them.

Figure 1:
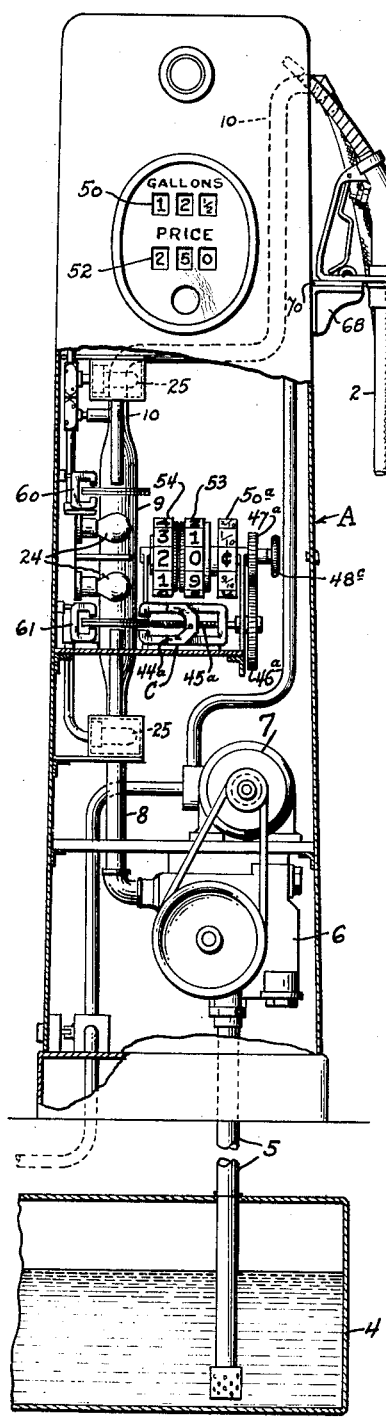
Fig. 1 is a side elevation of the liquid dispensing apparatus, said view being broken away and being shown partially in section.
Figure 2:
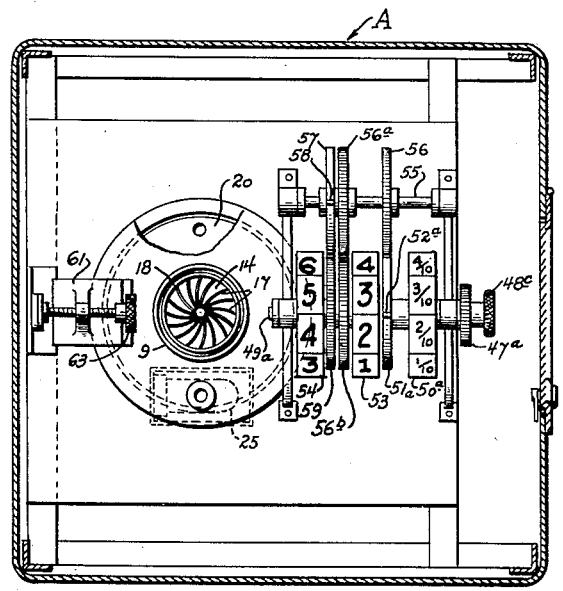
Fig. 2 is a cross-section taken on line II—II, Fig. 4.

Referring to the drawings in detail, and particularly to Fig. 1, A indicates in general a vertically disposed housing of suitable shape and design, from the upper portion of which extends a hose 2, which is provided with a suitable form of valve-controlled dispensing nozzle 3. The liquid to be dispensed, for instance, gasoline, may be stored in an underground tank 4. This is connected by means of a pipe 5 with the suction side of a pump 6 mounted in the base of the housing. The pump is driven by an electric motor 7, and the liquid discharged by the pump passes through a pipe 8 which delivers the liquid to the lower end of an expanded tube 9 through which it flows in an upward direction, being finally discharged from the upper end thereof through a pipe 10 which is connected with the hose 2 and the nozzle 3.

The expanded tube 9 contains two turbine wheels 14 and 15 (see Fig. 4), which are impelled or rotated by the flow of liquid through the tube. The turbine wheels operate entirely independently of each other and at different speeds, this being necessary as the wheel 14 actuates a liquid cost-computing and recording mechanism, while the wheel 15 actuates a liquid metering and recording mechanism. The price-computing and recording mechanism is electrically operated throughout, and so is the metering and recording of the number of gallons and fractions thereof dispensed. The turbine wheels function as actuators for the electrically operated portion of the mechanisms, to the extent that they control certain circuits thereof, other circuits being otherwise actuated, as will hereinafter appear.

Each turbine wheel consists of a central hub member secured to a shaft 16 which is mounted in suitable anti-friction bearings. Impeller blades 17 radiate therefrom, and their outer ends are secured within a ring 18, which ring functions as a support for an annular disc or plate which is constructed of a non-magnetic material, the purpose of which will hereinafter be described. Guide vanes of suitable pitch (as shown in Fig. 4) are disposed below each turbine wheel to properly guide and direct the flowing liquid against the blades of the respective turbines. Both turbine wheels are identical in construction; the lower wheel 14 carrying and rotating a non-magnetic disc 20, and the upper turbine wheel a non-magnetic disc 21. The lower disc has two apertures formed therein, disposed 180° apart, while the upper non-magnetic disc has only one aperture formed therein. The expanded tube or housing in which the turbine wheels are mounted is expanded to enclose the non-magnetic discs, and these expanded portions of the tube are each provided with windows on their upper and lower surfaces, through which beams of light are intermittently projected when the apparatus is in operation. The impeller blades of the upper wheel 15 are pitched to rotate approximately two revolutions per second when the delivery of the liquid through the expanded tube is at a maximum practical rate, which, in practice, has been found to be approximately twelve gallons per minute, and as the non-magnetic disc 21 carried thereby has only one aperture formed therein, this aperture will register with the window two times each second, thereby permitting the light beam projected against the windows to pass through that number of times. The impeller blades of the lower turbine wheel 14 are pitched to rotate approximately five revolutions per second when the flow of liquid through the expanded tube is passing at the maximum rate, and as the non-magnetic disc 20 carried and rotated thereby has two openings formed therein, spaced 180° apart, the beam of light will pass ten times through the window per second. The interrupted beams of light which pass through the respective windows are projected against photoelectric cells. These in turn actuate amplifiers, or similar means, hereinafter to be described, and these in turn supply the current to operate different circuits. While the speed of rotation of the turbine wheels has been referred to as two and five revolutions per second when the flow of liquid is at the maximum rate of delivery, their speed of rotation will obviously reduce proportionately as the liquid flow is reduced by closing the dispensing valve.

The price-computing mechanism which is actuated by the lower turbine wheel 14 is, as previously stated, electrically operated. The circuits operated in said mechanism contain variable electric constants which are capable of adjustment or calibration corresponding to fluctuating unit value per gallon of the liquid dispensed, said constants being calibrated for any selected unit of price set by the person responsible for its operation, within the limits of the apparatus. In the present instance, the apparatus is designed to compute the price of the liquid dispensed in steps of one cent up to a total sale of $9.99, at prices set within the apparatus beginning at five cents per gallon and terminating at fifty cents per gallon, in steps of $\frac{1}{10}$ of a cent between those limits. Similarly, the metering mechanism records the liquid dispensed in amounts of $\frac{1}{10}$ of a gallon up to 99.9 gallons. It should, however, be understood that these lower and upper limits are arbitrary and are not to be considered the limitations thereof.

The manner in which the metering portion of the apparatus operates will be as follows: Referring to Fig. 7, the numeral 24 indicates an exciter lamp which projects a beam of light towards the windows, controlled by the non-magnetic disc 21. This disc, as previously stated, has one opening formed therein, and once during each revolution this opening will register with the windows, and the beam of light will pass therethrough. This beam of light is projected against a photoelectric cell 25, causing excitation thereof, and a momentary flow of current from a battery B which causes a corresponding change in the voltage supplied to the grid of a vacuum tube or audion 27. The change in grid voltage is so poled as to result in an increase in the plate current of said audion, and causes a sufficient flow of current to cause energization of a magnet indicated at 39. This magnet actuates a recording mechanism hereinafter to be described.

A second exciter lamp 24 is placed above the non-magnetic disc 20 which is driven by the lower turbine wheel, and as this disc has two openings formed in it, and the turbine wheel rotates at approximately five revolutions per second, the beam of light will be permitted to pass through the windows approximately ten times each second. This causes excitation of a photoelectric cell 25a, resulting in a momentary current flow therethrough. This photoelectric cell is connected with an audion tube similar to the one indicated at 27, and actuates said tube in the same manner as previously described, and when that tube is energized the current flow set up will energize another magnet similar to magnet 39, which in turn actuates a recording mechanism which indicates the money value of the gasoline being dispensed. In view of the fact that the circuits actuated or controlled by the respective turbines are identical, it is thought that the illustration of one of said circuits will suffice. The circuit illustrated in the present instance is that which controls the metering and recording of the liquid being dispensed.

Figure 3:
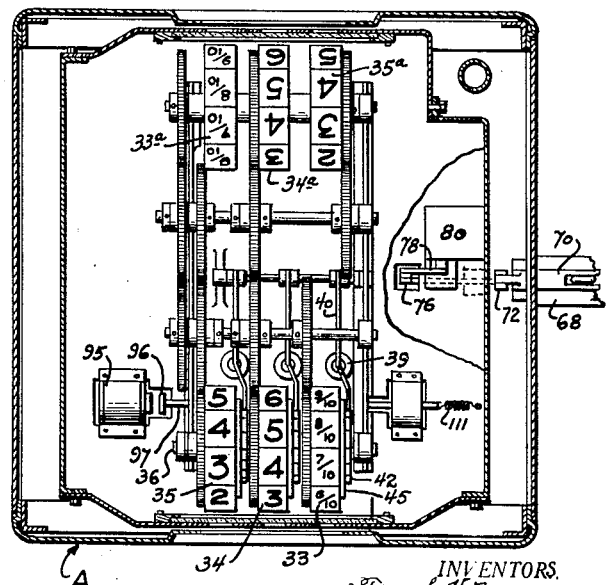
Fig. 3 is a cross-section taken on line III—III, Fig. 4.
Figure 6:
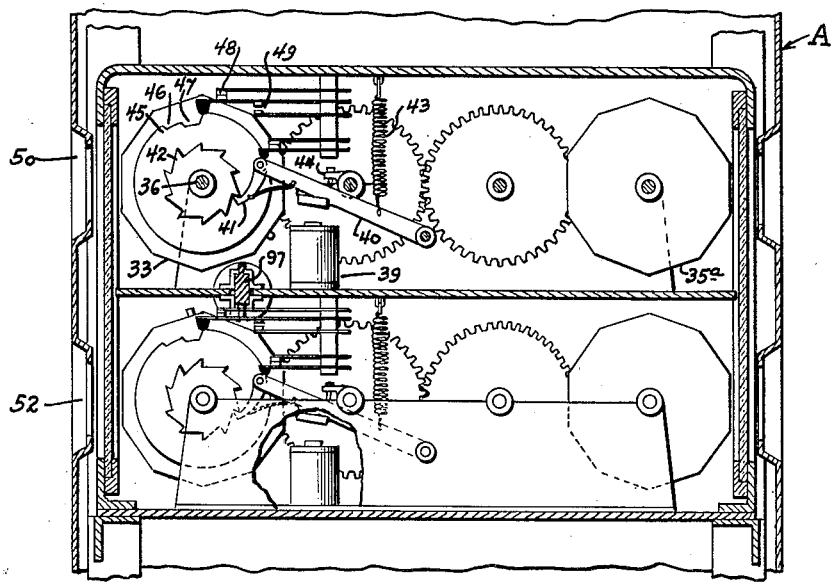
Fig. 6 is a vertical section taken on line VI—VI, Fig. 4.

The recording mechanism consists of three drums 33, 34 and 35 (see Figs. 3, 4, 6 and 7). These drums are similar to the drums of an ordinary odometer, to the extent that they have numerals printed or otherwise displayed on their faces, the drum 33 having numerals indicating amounts of the liquid being dispensed, in tenths of a gallon. The drums 34 and 35 are numbered 1 to 0 each, and indicate the amount of liquid dispensed, in gallons. The drums are all mounted on a common shaft, and are rotatable in successive order, the drum 33 being intermittently rotated $\frac{1}{10}$ of a revolution each time it is actuated, and when it has made one revolution, drum 34 will be moved $\frac{1}{10}$ of a revolution. When drum 34 has moved a complete revolution, drum 35 will move $\frac{1}{10}$ of a revolution, and so on. The manner in which the intermittent rotation is transmitted to the drums will be as follows: Referring to Figs. 3 and 4, the numeral 36 indicates the shaft on which the drums 33, 34 and 35 are mounted. At one side of each drum is mounted a magnet, these magnets being indicated at 37, 38 and 39. The magnet 39 will first be energized, and when energized it pulls a lever 40 in a downward direction. This lever carries a spring-actuated pawl 41 engaging a ratchet gear 42 secured to the drum 33. This magnet is only momentarily energized, the time or length of energization being no longer than the length of time the aperture in the non-magnetic disc 21 is in register with its window. When the magnet is deenergized, a spring 43 returns the lever against a stop 44, and in doing so the pawl engages the ratchet gear and rotates the disc 33, $\frac{1}{10}$ of a revolution. It was previously stated that the turbine wheel and the non-magnetic disc 21 rotated thereby rotate at the rate of two revolutions per second, and as this is the case, the magnet 39 will be energized twice a second, and will require ten energizations or five seconds to rotate drum 33 one revolution, and when it has made one revolution, the next drum, or that indicated at 34, will be rotated $\frac{1}{10}$ of a revolution. That is accomplished as follows: rotating with the disc 33 is a cam disc 45 having two depressions formed therein, as indicated at 46 and 47. As the disc 33 makes the last $\frac{1}{10}$ of a revolution, the lower arm of a switch 48 which rides on the face of the cam will drop into the depression 46 and thereby open the switch 48 and will close a circuit through a switch 49 when it drops into the depression 47. The switch 49 closes the circuit through the magnet 39 which actuates the disc 34. This magnet actuates a lever identical to that one indicated at 40 in Fig. 6, said lever having a pawl which actuates a ratchet gear secured to the disc 34; hence, when the continued rotation of the disc 33 and its cam 45 causes closing of the switch 48 and opening of the switch 49, the pawl will move upwardly and rotate the disc 34 $\tfrac{1}{10}$ of a revolution. When this disc has rotated one revolution it will close an identical circuit through a switch 49a, and thereby cause $\tfrac{1}{10}$ of a revolution in the disc 35.

Plainly speaking, each of the drums 33, 34 and 35 is provided with a cam disc such as shown at 45, said cam discs normally holding the switches 48, 48a and 48b in closed position, but opening said switches at the completion of one revolution and closing switches 49 and 49a in successive order when the depressions in the respective cam discs register with the switches 48, 48a and 48b. In view of the foregoing, it will be noted that every time the non-magnetic disc 21 makes one revolution, the opening formed therein will register with the window and permit the light from the exciter lamp 24 to pass through and momentarily energize the photoelectric cell 25. This in turn momentarily changes the voltage on the grid of the audion tube cooperating therewith, and this in turn causes a momentary flow of current through the magnet 39, the current being sufficient to energize it and actuate the lever 40, the operation continuing until the desired number of gallons and fractions thereof have been dispensed. When the dispensing operation is completed, the number of gallons and fractions thereof dispensed will be displayed through the upper window of the housing, indicated at 50.

The price recording mechanism, as previously stated, is identical in construction and operation. The recording discs are disposed behind the lower window of the housing, indicated at 52, and the numerals displayed indicate the price of the liquid dispensed, in dollars and cents. If it is desired to have display windows to indicate the number of gallons dispensed and the price thereof, on opposite sides of the housing, a gear transmission such as shown in Fig. 3 may be employed. That is, the drums indicated at 33, 34 and 35 are, in that instance, provided with gears such as shown, which transmit motion through another set of gears to a similar set of drums indicated at 33a, 34a and 35a, which are placed in reverse order. These drums are, in other words, mechanically moved in unison with the first named drums, and as such will display the same totals or amounts.

It is well known that the price of a liquid such as gasoline varies from time to time; for instance, a gallon of gasoline may cost 17½ cents today and the price may be raised to 18 cents or 19 cents or more the following day. In view of the fact that gasoline is subject to price changes, means must obviously be employed for varying the operation of the price computing mechanism so that the correct total may be assured.

The means employed is a magnetic brake which varies the speed of rotation of the lower magnetic disc 20. This brake is constructed and operated as follows: referring to Figs. 4 and 5, it will be noted that a permanent magnet is generally indicated at C. The legs 42a and 43a thereof straddle the peripheral edge of the non-magnetic disc, causing it to rotate through a magnetic field, and as the disc rotates, eddy currents are set up which produce a braking action, the braking action depending entirely upon the speed of rotation and the intensity of the magnetic field. Inasmuch as it is the intent to vary the speed of rotation of the turbine 14 and the non-magnetic disc 20, to permit price changes, it becomes necessary to vary the intensity of the magnetic field. This is accomplished by placing a cross-bar 44a across the legs of the magnet, and in addition thereto providing means for moving said cross-bar longitudinally of the legs of the magnet. Plainly speaking, the cross-bar acts as a magnetic shunt; the closer it is positioned to the outer ends of the legs of the magnet, the weaker the magnetic field. Conversely, as the cross- or shunting-bar 44a is moved in the opposite direction, the intensity of the magnetic field increases and the braking action increases with a consequent reduction in speed of rotation of the turbine and the disc 20. The position of the cross- or shunt-bar 44a which varies the magnetic field obviously determines the speed of rotation of the turbine and the non-magnetic disc 20, and hence the price of the gasoline that will be recorded. It is accordingly necessary to provide a vernier or some similar means for accurately positioning the shunt-bar 44a. This is accomplished as follows: extending through the shunt-bar 44a is a threaded shaft 45a, and mounted on the outer end thereof is a gear 46a which is rotated by an intermeshing gear 47a, said intermeshing gear having a turn-knob 48c secured thereto. The gear 47a and knob 48c are secured on a shaft 49a, and so is a price-indicating drum 50a and a mutilated gear 51a having a single tooth 52a. Freely rotatable on the shaft 49a are two price-indicating drums 53 and 54 which are intermittently rotated as follows: Disposed at one side of the drums is a shaft 55, and secured thereon is a gear 56 which is rotated $\tfrac{1}{10}$ of a revolution for each complete revolution of the shaft 49a. That is, the single tooth 52a on the gear 51a will engage the teeth on the gear 56 once during each revolution of the shaft 49a, and thus rotate said gear, together with the shaft 55, $\tfrac{1}{10}$ of a revolution. Also secured on the shaft 55 is a gear 56a, which intermeshes with a similar gear 56b, which is secured to the drum 53; and also secured on shaft 55 is a mutilated gear 57 having a single tooth 58 which will intermesh with a gear 59 secured to the drum 54. By this gearing arrangement, it takes ten revolutions of the drum 50a to transmit one revolution to the drum 53, as the single tooth 52a will engage the gear 56 only once during each revolution of the drum 50a. Again, it will take ten revolutions of the drum 53 to transmit one revolution to the drum 54, as it will take ten revolutions of the shaft 55 to rotate the single-toothed gear 57 the proper number of times to rotate the drum 54 one revolution.

The drum 50a is graduated into numerals indicating tenths of a cent, and the drums 53 and 54 are provided with numerals indicating cents. If the price of gasoline to be sold is twenty cents a gallon, the drums are rotated to assume the position shown in Fig. 4. During such rotation, the threaded bar 45 is rotated through the gears 46a and 47a, and the shunting bar will have been moved to a position between the legs of the magnet, where it will produce a magnetic field of the proper intensity to permit the turbine 14 and its non-magnetic disc to rotate at a speed which will register twenty cents a gallon. If the price is increased to more than twenty cents a gallon, the shunt-bar will be moved to position where the intensity of the magnetic field is further lessened so as to proportionately increase the speed of the turbine and non-magnetic disc. Conversely, if the price is less than twenty cents, the shunt-bar will be moved to position where the intensity of the magnetic field is increased so as to proportionately slow down the speed of the turbine and the non-magnetic disc, as disclosed by the numerals appearing on the drums.

Since it is necessary to adjust each impeller to a unit rate of speed for a unit of volume and price respectively, it is essential to provide calibrating means to insure correct results. It has previously been stated that the disc 21 rotates two times per second for each $\frac{1}{10}$ gallon, and the disc 20 five times per second at the maximum price rate of fifty cents per gallon. Since the rate of rotation is retarded to the extent that a magnetic field acts upon the discs, permanent calibrating magnets 60 and 61 are provided. These are supported on guides 62, and are adjusted by means of thumb-turns 63. An electric eddy current will be produced and dissipated in the discs as they rotate through the magnetic fields produced by the respective magnets. Thus current proportionate to the rate of rotation of the discs will be likewise proportionate to the rate of flow of the liquid. The amount of retardation necessary to set the rate of rotation of each disc, as above stated, is governed by turning the thumb-turns 63 which move either to or away from the peripheral edges of the discs. It is thus only necessary to adjust the calibrating magnets until the pump accurately delivers, under test, $\frac{1}{10}$ of a gallon of liquid, to advance the gallons counter $\frac{1}{10}$ gallon at any speed, and similarly, to advance the price counter five cents when $\frac{1}{10}$ of a gallon is delivered, and the vernier is set to register value up to fifty cents per gallon. When properly adjusted, the apparatus will meter the liquid and compute the value of any amount at any speed and price set by the operator.

The circuit through the exciter lamps heretofore referred to is controlled by a Burgess type of vacuum switch, indicated at 65. This switch or tube is provided with a vane on its inner end which projects into the tube through which the gasoline discharges. The switch within the tube closes the moment the slightest flow of liquid commences, and when it closes, it cuts out the resistance indicated at 66, thereby permitting the exciter lamps to glow to full capacity. In other words, the A. C. current supplied to the wires indicated at 68a and 68 normally passes through a resistance 66 and the exciter lamps, and the amount of current which passes is just sufficient to keep the tubes warm enough so that when the switch 65 closes, light will immediately be produced. In the same circuit with the exciter lamps is a liquid flow indicating lamp 67 which serves the function of indicating whether liquid is flowing or not, and also serves as a telltale to indicate that the filaments in the lamps 24 are not burnt out.

In actual operation, it is obviously necessary to remove the dispensing nozzle from its support and to open the valve in the dispensing nozzle before any liquid can be dispensed. The first operation, to wit, that of removing the nozzle from its support, is utilized to perform two important functions: (1) to re-set the gallon- and price-indicating drums; and (2) to close the circuit through the motor which drives the pump. The closing of the motor circuit is accomplished as follows: Referring to Figs. 1 and 4, 68 indicates a bracket secured on the exterior surface of the housing A. Pivotally mounted inside the housing, as at 69, is a lever 70, one end of which rests on top of the bracket. The other end of the lever 70 is connected by means of a link 72 with a lever 73 pivoted at the point 74. The lever 70 is held in the position shown in Fig. 1 by the weight of the dispensing nozzle, but the moment the dispensing nozzle is lifted free of its support, lever 70 swings about the pivot 69 so as to move the link 72 in a downward direction, said movement being insured by the use of a pull-spring such as shown at 75. When the link 72 moves downwardly, a second link 76 connected with the opposite end of the lever 73 will move upwardly. The link 76 is connected to the lever arm 78 of a switch 79 whereby the circuit to the motor 7 is closed. Conversely, when the dispensing nozzle is placed back on the shelf, it depresses the lever 70 and thereby reverses the position of the links 72 and 76, causing return movement of the lever 78 and opening or breaking of the circuit through the motor.

Disposed below the cabinet 80 in which the motor switch is mounted is a switch 81 which is momentarily closed when the motor switch is closed. This is accomplished as follows: disposed adjacent the link 76 is a rod 82 on which is secured a collar 83; and normally maintaining the rod and collar in depressed position when the switch 81 is open is a spring 84. The rod is guided in a tubular sleeve 85, and has a second collar 86 secured on it which is engaged by a spring latch 87 secured to the link 76. When the link 76 is raised as previously described, the latch 87 engages the under side of the collar 86 and raises the rod, together with the collar 83, thereby closing switch 81, but as link 76 continues its upward movement the spring latch yields and passes by the collar 86, permitting the rod 82 to be depressed again by the spring 84, thus opening switch 81. Switch 81 may also be closed by a push button 88 which projects through the housing. This button is connected with a rod 89 on which is formed an upper cam 90 and a lower cam 91. The rod is spring-actuated, as shown at 92, said spring holding the button in extended position and the cam 90 out of engagement with the lower end of the rod 82. By pushing inwardly on the button 88, cam 90 is moved in under the lower end of the rod 82, and it is raised sufficiently to close the switch 81. The moment the button is released, the rod returns and the switch is again opened. On the lever 73 is formed a latch 73a which aligns with a cam or latch 91. Latch 73a aligns with the cam 91 when the link 76 is raised and the motor switch is closed, thus preventing manual operation or closing of switch 81 through means of the button 88 when the motor circuit is closed.

Switch 81 controls the re-setting operation of the gallon- and price-indicating drums, and its operation will now be described. Referring to Fig. 7, a magnet is shown which has two coils or separate windings, indicated at 94 and 95. The coil 94 will hereinafter be referred to as the holding coil, and the coil 95 as the auxiliary coil, the circuit through the auxiliary coil being closed only when switch 81 is closed. Disposed in front of the magnet is an armature 96 to which is connected a bar 97, said bar having three contact members 98, 99 and 100, which cooperate with three stationary contact members 98a, 99a and 100a, the bar having also a wire 101 connected to it, the other end of said wire connecting with the ground side of the circuit as shown at 102. One side of the switch 81 is connected with the ground wire 102, as shown. The other side of the switch 81 is connected through a wire 103 with one terminal of the auxiliary coil 95. The other terminal is connected through a wire 104 with the feed side of the circuit indicated by wire 105. One terminal of the holding coil 94 is also connected, through the wire 104, with the feed side of the circuit, while the other terminal connects, through a wire 106, with a common wire 107, said common wire being connected with one side of each of the switches indicated at 48, 48a and 48b, and as these switches are normally closed, a continuous circuit will be maintained in the holding coil 94, as the other side of each of the switches 48, 48a and 48b is connected with the ground wire 102. The current in the holding coil 94 is not sufficient to attract the armature 96, but when current is momentarily passed through the auxiliary coil 95, by the closing of the switch 81, sufficient magnetic force is produced to attract the armature 96 and the bar 97 connected thereby, and when it has been attracted, the holding coil will hold it, thus closing circuits through the contacts 98, 99 and 100. The contacts 98, 99 and 100 control circuits which actuate the magnets 37, 38 and 39, and switches 37a, 38a and 39a cooperating therewith, hence, as the magnets 37, 38 and 39 are energized, each gallon- and price-indicating drum will be intermittently rotated until it reaches substantially zero position. At these points, when zero position is reached on the respective drums, the depressed portion 46 of the cams 45 will register with the switches 48, 48a and 48b, opening all of them, and thereby breaking the circuit through the holding coil 94 of the magnet. This releases the armature 96 and the bar 97, and opens the circuits controlled by the contacts 98, 99 and 100. In order that the drums shall not rotate beyond zero position, bar 97 (see Fig. 7) is provided with three lugs such as shown at 110. These lugs align with pins on the sides of the drums, and as each drum reaches substantially zero position, the pin on that drum will engage an adjacent lug 110, and as the pin on each drum comes in contact with its lug, all the drums will finally be stopped when they reach substantially zero position. At that point, the circuits through the magnets 37, 38 and 39 are broken, the circuit through the holding coil 94 is also broken, and bar 97 is then returned to normal position by the pull of a spring 111, allowing springs 43 to pull the drums to final zero position, thus completing the re-setting of the drums. The circuit through the motor which operates the pump is not completely closed until the re-setting operation is completed, as the bar 97 actuates a switch 112 in the motor circuit (see Fig. 7). That switch is not closed until the spring 111 returns the bar to normal position, and when switch 112 is closed the motor circuit is completed and the pump starts. Pumps of this character are provided with a by-pass, so that they can operate and circulate liquid even though the dispensing nozzle is not opened. Hence, no flow of liquid will pass through the expanded tube, or, in other words, through the metering and price-computing mechanism, until the valve in the dispensing nozzle is actually opened, and then only while liquid continues to flow through the expanded tube as the operation of the turbines together with the metering and price-computing mechanism depends upon liquid flow. In connection with the vernier shown in Fig. 4, it is obvious that a window may be formed in the housing to make it possible both for the operator and the public to read the price at which the liquid is being dispensed. We wish it understood that switches and other mechanism which may be subject to arcing or sparking are enclosed in suitable vapor-proof boxes, as shown in Fig. 4, and while these and other features of the present invention have been more or less specifically described and illustrated, we nevertheless wish it understood that various changes may be resorted to within the scope of the appended claims, and that the materials and finish of the several parts employed may be such as the judgment and experience of the manufacturer may dictate or other conditions may demand.

Having thus described and illustrated our invention, what we claim and desire to secure by Letters Patent is:

1. In an apparatus of the character described the combination with a duct through which liquid to be dispensed is adapted to flow, of a turbine rotor in the duct, a disc secured to the rotor, a housing enclosing the disc, said housing having a window and the disc having an aperture formed therein adapted to register with the window once during each revolution of the rotor and disc, a light-projecting lamp disposed adjacent one side of the window, a photoelectric cell disposed adjacent the opposite side of the window, and adapted to be energized by light projected through the window when the aperture in the disc registers therewith, a switch controlling current flow through the light-projecting lamp, and means actuated by flow of liquid through the duct for closing the switch, and conversely, for opening the switch when liquid flow ceases.

2. In an apparatus of the character described the combination with a duct through which liquid to be dispensed is adapted to flow, of a turbine rotor in the duct, a disc secured to the rotor, a housing enclosing the disc, said housing having a window and the disc having an aperture formed therein adapted to register with the window once during each revolution of the rotor and disc, a light-projecting lamp disposed adjacent one side of the window, a photoelectric cell disposed adjacent the opposite side of the window and adapted to be energized by light projected through the window when the aperture in the disc registers therewith, a switch controlling current flow through the light-projecting lamp, means actuated by flow of liquid through the duct for closing the switch, and conversely, for opening the switch when liquid flow ceases, a plurality of electric circuits controlled by the photoelectric cell, and an electrically operated numeral-displaying and registering mechanism controlled and operated by said circuits.

3. In a liquid dispensing apparatus means for registering and displaying the cost of the liquid dispensed, said means comprising a conduit through which the liquid flows, a turbine rotor in the conduit and operated by the flowing liquid, mechanism for registering and displaying the amount of liquid dispensed, electrically operated means for operating the register, a nonmagnetic disc rotated by the rotor, said disc having an aperture formed therein which is adapted to register once during each revolution with a window, a source of light adjacent one side of the window, a photoelectric cell on the opposite side, said cell being energized by a beam of light passing through the window when the aperture in the disc registers with the window, means actuated by energization of the photoelectric cell for opening and closing electric circuits to control the electrically operated register, a magnet disposed adjacent the disc, means for variably shunting the flux of the magnet to vary the intensity of the magnetic field across the disk and thereby the eddy currents produced in the disc, so as to increase or decrease the speed of rotation of the rotor and the non-magnetic disc.

4. In a liquid dispensing apparatus means for registering and displaying the cost of the liquid dispensed, said means comprising a conduit through which the liquid flows, a turbine rotor in the conduit and operated by the flowing liquid, a register for displaying the cost of the liquid dispensed, electrically operated means for operating the register, a non-magnetic disc rotated by the rotor, said disc being mounted in the same conduit as the rotor and being at all times submerged in the liquid passing through the conduit, said disc having an aperture formed therein which is adapted to register once during each revolution with a pair of windows formed in the conduit, a source of light adjacent one side of said windows, a photo-electric cell on the opposite side of said windows, said cell being energized by a beam of light passing through the windows when the aperture in the disc registers with the windows, means actuated by energization of the photo-electric cell for opening and closing electric circuits to control the electrically operated register, a U-shaped magnet disposed exteriorly of the conduit but straddling a portion of the conduit and the disc mounted therein to maintain a magnetic field across the disc, and means for adjusting the position of the magnet so as to increase or decrease the speed of rotation of the rotor and the non-magnetic disc.

5. In a liquid dispensing apparatus means for registering and displaying the cost of the liquid dispensed, said means comprising a conduit through which the liquid flows, a turbine rotor in the conduit and operated by the flowing liquid, a register for displaying the cost of the liquid dispensed, electrically operated means for operating the register, a non-magnetic disc rotated by the rotor, said disc being mounted in the same conduit as the rotor and being at all times submerged in the liquid passing through the conduit, said disc having an aperture formed therein which is adapted to register once during each revolution with a pair of windows formed in the conduit, a source of light adjacent one side of said windows, a photo-electric cell on the opposite side of said windows, said cell being energized by a beam of light passing through the windows when the aperture in the disc registers with the windows, means actuated by energization of the photo-electric cell for opening and closing electric circuits to control the electrically operated register, a U-shaped magnet disposed exteriorly of the conduit but straddling a portion of the conduit and the disc mounted therein to maintain a magnetic field across the disc, and means for varying the intensity of the magnetic field and thereby eddy currents produced in the disc so as to increase or decrease the speed of rotation of the rotor and the non-magnetic disc.

6. In a liquid dispensing apparatus means for registering and displaying the cost of the liquid dispensed, said means comprising a conduit through which the liquid flows, a turbine rotor in the conduit and operated by the flowing liquid, a register for displaying the cost of the liquid dispensed, electrically operated means for operating the register, a non-magnetic disc rotated by the rotor, said disc being mounted in the same conduit as the rotor and being at all times submerged in the liquid passing through the conduit, said disc having an aperture formed therein which is adapted to register once during each revolution with a pair of windows formed in the conduit, a source of light adjacent one side of said windows, a photo-electric cell on the opposite side of said windows, said cell being energized by a beam of light passing through the windows when the aperture in the disc registers with the windows, means actuated by energization of the photo-electric cell for opening and closing electric circuits to control the electrically operated register, a U-shaped magnet disposed exteriorly of the conduit but straddling a portion of the conduit and the disc mounted therein to maintain a magnetic field across the disc, adjustable means for varying the intensity of the magnetic field and thereby eddy currents produced in the disc so as to increase or decrease the speed of rotation of the rotor and the non-magnetic disc, and a vernier to indicate the position of said adjustable means.

7. In a liquid dispensing apparatus an elongated tubular-shaped housing having a liquid inlet at one end and a discharge outlet at the other through which the liquid to be dispensed flows, a turbine rotor in said housing driven by the flowing liquid, said rotor being mounted on an axis centrally and longitudinally disposed with relation to the housing, said housing being enlarged in diameter at a point adjacent the rotor, a non-magnetic disc driven by the rotor and extending into the large portion of the housing, said disc having an aperture formed therein which is adapted to register once during each revolution with a pair of windows formed in the enlarged portion of the housing, a source of light adjacent one of said windows, a photo-electric cell adjacent the opposite window, said cell being energized by a beam of light passing through the windows when the aperture in the disc registers with the windows, means actuated by energization of the photo-electric cell for opening and closing a control circuit through an electrically operated register, a U-shaped magnet disposed exteriorly of the housing but straddling a portion of the enlarged part of the housing and the non-magnetic disc mounted therein to maintain a magnetic field across the disc, and means for adjusting the position of the magnet to increase or decrease the speed of rotation of the rotor and the non-magnetic disc.

8. In a liquid dispensing apparatus an elongated tubular-shaped housing having a liquid inlet at one end and a discharge outlet at the other through which the liquid to be dispensed flows, a turbine rotor in said housing driven by the flowing liquid, said rotor being mounted on an axis centrally and longitudinally disposed with relation to the housing, said housing being enlarged in diameter at a point adjacent the rotor, a non-magnetic disc driven by the rotor and extending into the large portion of the housing, said disc having an aperture formed therein which is adapted to register once during each revolution with a pair of windows formed in the enlarged portion of the housing, a source of light adjacent one of said windows, a photoelectric cell adjacent the opposite window, said cell being energized by a beam of light passing through the windows when the aperture in the disc registers with the windows, means actuated by energization of the photo-electric cell for opening and closing a control circuit through an electrically operated register, a U-shaped magnet disposed exteriorly of the housing but straddling a portion of the enlarged part of the housing and the non-magnetic disc mounted therein to maintain a magnetic field across the disc, and means for varying the intensity of the magnetic field and thereby eddy currents produced in the disc so as to increase or decrease the speed of rotation of the rotor and the non-magnetic disc.

9. In a liquid dispensing apparatus an elongated tubular-shaped housing having a liquid inlet at one end and a discharge outlet at the other through which the liquid to be dispensed flows, a turbine rotor in said housing driven by the flowing liquid, said rotor being mounted on an axis centrally and longitudinally disposed with relation to the housing, said housing being enlarged in diameter at a point adjacent the rotor, a non-magnetic disc driven by the rotor and extending into the large portion of the housing, said disc having an aperture formed therein which is adapted to register once during each revolution with a pair of windows formed in the enlarged portion of the housing, a source of light adjacent one of said windows, a photo-electric cell adjacent the opposite window, said cell being energized by a beam of light passing through the windows when the aperture in the disc registers with the windows, means actuated by energization of the photo-electric cell for opening and closing a control circuit through an electrically operated register, a U-shaped magnet disposed exteriorly of the housing but straddling a portion of the enlarged part of the housing and the non-magnetic disc mounted therein to maintain a magnetic field across the disc, a switch controlling a current flow through the light projecting lamp, and means actuated by the flow of liquid through the housing for closing the switch and, conversely, for opening the switch when liquid flow ceases.

FRANK V. MAYO.
WILLIAM H. MISSON.